United States Patent [19]

Corry

[11] 4,236,408
[45] Dec. 2, 1980

[54] DRILLING RIG LOAD INDICATOR

[75] Inventor: Stuart E. Corry, Hallett, Okla.

[73] Assignee: The Geolograph Company, Oklahoma City, Okla.

[21] Appl. No.: 45,393

[22] Filed: Jun. 4, 1979

[51] Int. Cl.$^3$ .............................................. E21B 47/00
[52] U.S. Cl. ....................................................... 73/151
[58] Field of Search ................... 73/151; 177/141, 208, 177/209, 254; 175/203

[56] References Cited

U.S. PATENT DOCUMENTS

| 2,349,228 | 5/1944 | Wolff | 177/208 X |
| 2,472,689 | 6/1949 | Adams et al. | 177/209 X |
| 2,838,283 | 6/1958 | Simmonds et al. | 175/203 |
| 3,060,732 | 10/1962 | Corry | 177/208 X |

*Primary Examiner*—Jerry W. Myracle
*Attorney, Agent, or Firm*—William S. Dorman

[57] ABSTRACT

A drilling rig load indicator for use on a mobile drilling rig of the type which is provided with means for applying a downward force to a drill string and bit and for applying a lifting force to raise the drill string and bit, and being further provided with a hydraulic pressure source which operates a plurality of hydraulic jacks to support and level the drilling rig. The drilling rig load indicator is composed of a hydraulic totalizer, a pressure indicator, and, a plurality of hydraulic pressure gauges. The hydraulic totalizer has an input side which is connected by means of conduits to the hydraulic jacks and an output side which represents the summation of the loads upon the hydraulic jacks. In the event that the conduits cannot be connected to the hydraulic jacks, the conduits may be connected to separate hydraulic load cells which are placed between the hydraulic jacks and the earth. The pressure indicator, which is connected to the output side of the totalizer, and is adapted to visually display the summation of the loads upon the hydraulic jacks or load cells, is provided with a dial face that has two sectors, one sector representing the amount of applied downward force, the other representing the amount of applied lifting force. The hydraulic pressure gauges are each connected to a hydraulic jack or load cell and are adapted to visually display the load thereupon.

2 Claims, 4 Drawing Figures

DRILLING RIG LOAD INDICATOR

BACKGROUND OF THE INVENTION

1. Field of the Invention

The present invention relates to a drilling rig load indicator for use in combination with a mobile drilling rig of the type having a plurality of hydraulic jacks used to support and level the drilling rig, and, more particularly, to such an indicator which visually displays the load or force upon each of the hydraulic jacks, as well as the amount of downward force or "Pull Down Load" applied to a drill string and bit and the amount of lifting force or "Hook Load" required to lift the drill string and bit.

2. Description of the Prior Art

There are numerous weight or load indicators in use today which visually display and/or record the load or force upon a drill bit utilized in the larger or stationary drilling rigs. However, there appears to be a lack of prior art indicators, to be used in combination with a mobile drilling rig of the type which is generally provided with a plurality of hydraulic jacks used to support and level the drilling rig.

SUMMARY OF THE INVENTION

The present invention provides a drilling rig load indicator for use in connection with a mobile drilling rig of the type normally employed to drill water wells or other shallow depth wells. The drilling rig itself includes the conventional derrick mast structure which is attached to a conventional platform extending from the rear of a vehicle. The derrick structure is provided with a rotary table mounted on the platform, a drill string composed of sections of drill pipe adapted to extend through the rotary table, a drill bit which can be attached to the lower end of the drill string, and a pull-down swivel which is generally attached to the upper end of the drill string. The drilling rig is also provided with pull-down chains and pull-down motors which are adapted to exert a downward force on the drill string by utilizing all or a portion of the drilling rig itself. The drilling rig is also provided with a conventional cable and blocks for lifting the drill string when it is desired to do so. The platform for a light weight, mobile drilling rig of the type referred to herein is also provided with a pair of hydraulic jacks located on opposite sides of the platform for leveling the drilling rig so that the drill bit will bore in a true vertical direction. The present invention includes a pair of hydraulic pressure indicators adapted to sense the loads on each of the hydraulic jacks, a hydraulic totalizer adapted to sense the total combined pressure on the two hydraulic jacks, and a pressure indicator responsive to the output of the totalizer for showing both "Pull-Down Load" and "Hook Load." In the event that it is undesirable (or impossible) to connect the foregoing pressure sensing devices into the hydraulic chambers of the hydraulic jacks, separate hydraulic load cells can be placed between the bottoms of the jacks and the ground and are connected to the hydraulic sensing devices in the same manner as described above in reference to the jacks.

DETAILED DESCRIPTION OF THE PREFERRED EMBODIMENTS

Figure 1:
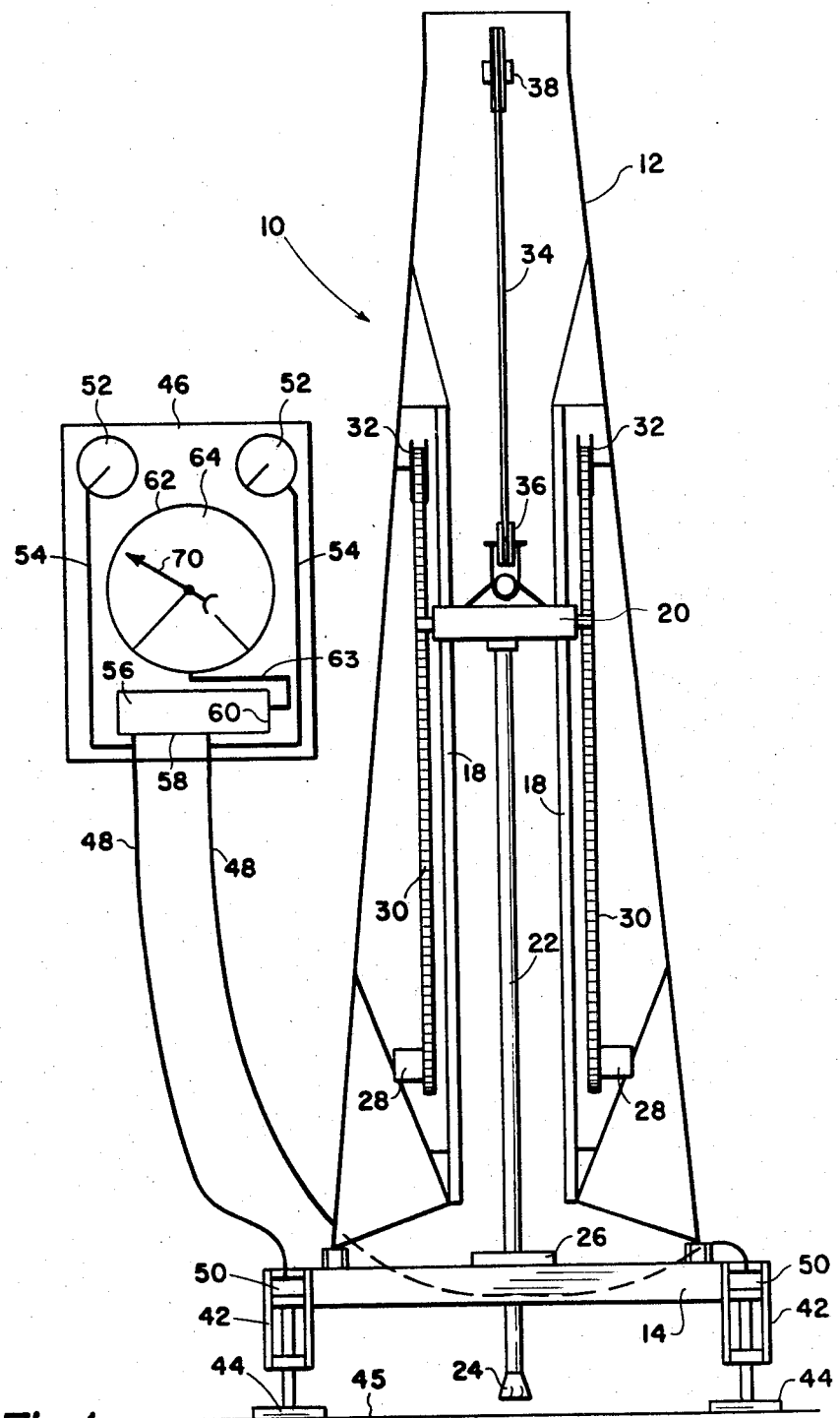
FIG. 1 is a semi-diagrammatic end view of a drilling derrick with a rig load indicator, embodying the present invention, operatively connected thereto.
Figure 2:
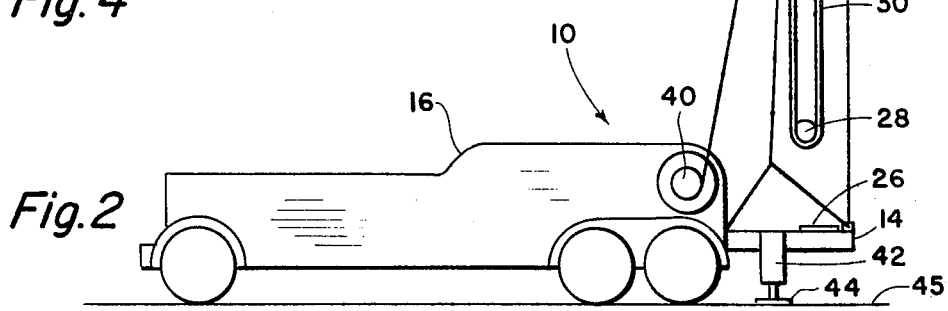
FIG. 2 is a semi-diagrammatic left side elevational view of a drilling vehicle, with a drilling derrick mounted on the rear thereof.

Referring to the drawings in detail, reference character 10 generally indicates a mobile drilling rig of the type used to drill water wells or other shallow depth wells. As shown in FIGS. 1 and 2, the drilling rig 10 is composed of a derrick mast structure 12 which is attached to a platform 14, which, in turn, extends from the rear of a vehicle 16. Oppositely spaced within the derrick structure 12 are a plurality of vertical masts 18, whereby a pull-down swivel 20 is adapted to slide axially along the masts 18. The pull-down swivel 20 is adapted to hold the upper end of a drill pipe 22 which has a drill bit 24 attached to the lower end thereof. The drill pipe 22 extends through a powered rotary table 26 which is mounted for rotation on the platform 14 of the drilling rig 10.

Drill pipes 22, which are used to drill shallow depth wells, are generally small in diameter and lightweight and, therefore, can exert only a light bit load. To provide a heavier bit load or pressure, the drilling rig 10 is provided with a plurality of motors 28, which are mounted on the lower portion of the derrick structure 12, and pull-down chains 30. The pull-down chains 30 pass around the output pulleys (not shown) of the motors 28 and around a plurality of upper pulleys 32, which are mounted for rotation within the upper portion of the derrick structure 12. The pull-down swivel 20 is attached to the pull-down chains 30, whereby, the pull-down swivel 20, with the drill pipe 22 attached thereto, is forced downward by the rotation of the motors 28 and chains 30, which, in turn, transfers the weight of the drilling rig 10 to the rotating drill pipe 22 and, thus, to the drill bit 24. As can be seen, the maximum pull-down force or load achievable represents the maximum weight of the drilling rig 10.

When the drill pipe 22 is to be raised, the motors 28 are placed in the "neutral" position; thereupon, a hoisting lift is applied to the pull-down swivel 20 by means of a cable 34 which is secured at one end thereof to a brace or other stationary connection (not shown) mounted within the top portion of the derrick structure 12. The cable 34 passes around a lower traveling pulley or block 36, which is attached to the top portion of the pull-down swivel 20, and around an upper pulley or crown 38, which is mounted for rotation within the top portion of the derrick structure 12. As best shown in FIG. 2, the opposite end of the cable 34 is attached to a powered winch 40, which is mounted on the rear portion of the vehicle 16. It should be noted that when a pull-down force is applied to the drill pipe 22, the powered winch 40 is placed in the "neutral" position so as to allow free movement of the pull-down swivel 20.

The drilling rig 10 is provided with a rig bed leveling system which consists of a plurality of hydraulic jacks 42, with pads 44 attached thereto, which are mounted at opposite sides of the bed 14. Hydraulic pressure from a hydraulic pressure source (not shown), through control valves (not shown) which are controlled by the rig operator, extends the jacks 42 into contact with the earth 45. By individual adjustment of the jacks, the bed 14 is then placed in a level horizontal plane so that the drill bit 24 will drill a bore (not shown) perpendicular to the earth. The hydraulic jacks 42, by necessity, are of sufficient capacity to resist the maximum downward force on the drill pipe 22 generated by the motors 28 and chains 30.

As shown in FIG. 1, a drilling rig load indicator 46 is operatively connected by means of conduits 48 to hydraulic chambers 50, which are spaced within each of the hydraulic jacks 42. In the event that the conduits 48 can not be connected directly to the hydraulic chambers 50, the conduits 48 may be connected to hoses (not shown) which provide hydraulic pressure from the hydraulic pressure source (not shown) for the hydraulic jacks 42. Although not shown on the drawings, it should be understood that the hydraulic pressure source will connect with the chambers 50 of the jacks and will be provided with individual valves (not shown) for operating the jacks individually to create the leveling condition described above.

The drilling rig load indicator 46 is composed of a plurality of pressure gauges 52, which are connected to the conduits 48 by means of hoses 54; a hydraulic totalizer 56, with the conduits 48 attached to an input side 58 thereof and having an output side 60 whose pressure represents the summation of the loads upon the hydraulic jacks 42; and a pressure indicator 62 which is connected by means of a hose 63 to the output side 60 of the hydraulic totalizer 56. When hydraulic pressure is applied to the hydraulic jacks 42, the pressure gauges 52 indicate the pressures or loads upon the individual hydraulic jacks 42 and the pressure indicator 62 indicates the total load upon both the hydraulic jacks 42, as summated by the hydraulic totalizer 56.

Figure 4:
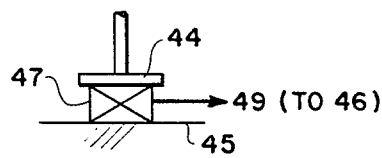
FIG. 4 is a semi-diagrammatic representation of a modified pressure sensing means.

On certain types of drilling rigs 10, the conduits 48 are not able to be connected to the hydraulic pressure source or to the hydraulic chambers 50. In this event, separate hydraulic load cells 47 (shown diagrammatically in FIG. 4) are placed between the pads 44 and the ground 45 and are operatively connected to the drilling rig load indicator 46 by means of conduits 49 similar to the conduits 48.

Figure 3:
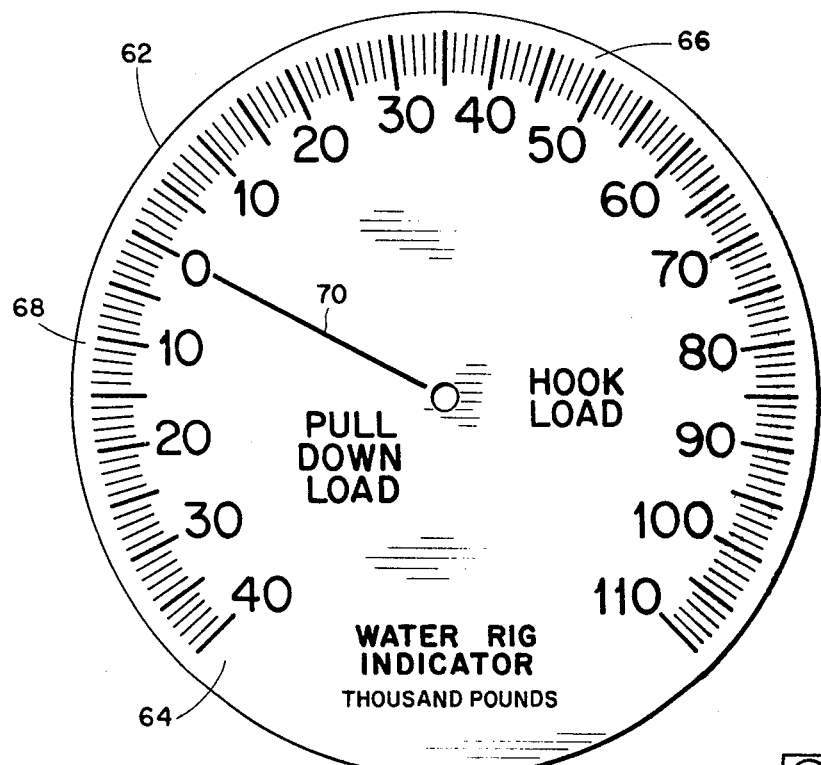
FIG. 3 is a pressure gauge dial face.

As best shown in FIGS. 1 and 3, the pressure indicator 62 is provided with a dial face 64, which is provided with two adjoining sectors 66 and 68, whereby, the point of adjoinment of said sectors represents a "zero" position. This "zero" position is obtained by manually moving the pointer 70 to zero after the bed 14 has been levelled. Thus, this "zero" position represents the maximum weight of the rig (vehicle plus drill string, etc.) as provided by the pressure from the jacks 42. From the "zero" position to the end of the sectors 68, the dial 64 will indicate the amount of lifting force or "Hook Load".

As the bit 24 contacts the earth with increased pressure from the pull-down swivel 20, pressure is relieved from the jacks 42 and the totalized force from 60 is indicated on the sector 68 as "Pull Down Load" which, in effect, is the bit load which can be varied as desired by the operator by control of the motors 28. Conversely, as the force from the pull-down 20 is reduced to no force, the pressure from the chambers 50 of the jacks 42 will increase to the maximum weight of the total rig structure so as to return the pointer to zero.

Should the drill bit 24 become stuck by various well bore conditions, the pull-down motors 28 are placed in neutral and the hoist winch 40 is actuated to lift the drill string 22; however, the additional lifting force required to overcome the "stuck" condition will be registered (or indicated) on the sector 66 as "Hook Load".

Whereas, the present invention has been described in particular relation to the drawings attached hereto, it should be understood that other and further modifications of the invention, apart from those shown or suggested herein, may be made within the scope and spirit of the invention.

What is claimed is:

1. A drilling rig load indicator of the type used on mobile drilling rigs which are provided with a drill string and drill bit to drill a bore into the earth, means for applying a downward force upon said string and bit, means for applying a lifting force to raise said string and bit, a plurality of hydraulic jacks which provide means to support and level said drilling rigs, and being further provided with a hydraulic pressure source which operates said jacks; said drilling rig load indicator being composed of a hydraulic totalizer, said totalizer having an input side in fluid communication by means of conduits with said hydraulic jacks and having an output side which represents the summation of the loads upon said jacks; and a pressure indicator, said pressure indicator being connected to said output side of said hydraulic totalizer and being adapted to visually display the summation of the loads upon said jacks; wherein said drilling rig load indicator is provided with a plurality of hydraulic pressure gauges, each of said pressure gauges being connected to said conduits and being adapted to visually display the load upon one of said jacks; and wherein said pressure indicator is provided with an adjustable rotating pointer and a dial face, said dial face being provided with two adjoining sectors, whereby, the point of adjoinment of said sectors represents a "zero" position, and from said "zero" position to the end of one of said sectors represents the amount of said downward force, and from said "zero" position to the end of the second of said sectors represents the amount of said lifting force.

2. A drilling rig load indicator of the type used on mobile drilling rigs which are provided with a drill string and drill bit to drill a bore into the eart, means for applying a lifting force to raise said drill string and bit, a plurality of hydraulic jacks which provide means to support and level said drilling rigs and being further provided with a hydraulic pressure source which operates said jacks; said drilling rig load indicator being composed of a plurality of hydraulic load cells, said load cells being spaced between said jacks and the earth; a hydraulic totalizer, said totalizer having an input side in fluid communication by means of conduits with said load cells and having an output side which represents the summation of the loads upon said load cells; and a pressure indicator, said pressure indicator being connected to said output side of said hydraulic totalizer and being adapted to visually display the summation of the loads upon said load cells; wherein said drilling load indicator is provided with a plurality of hydraulic pressure gauges, each of said pressure gauges being connected to said conduits and being adapted to visually display the load upon one of said load cells; and wherein said pressure indicator is provided with an adjustable rotating pointer and a dial face, said dial face being provided with two adjoining sectors, whereby, the point of adjoinment of said sectors represents a "zero" position, and from said "zero" position to the end of one of said sectors represents the amount of said downward force and from said "zero" position to the end of the second of said sectors represents the amount of said lifting force.

* * * * *